United States Patent [19]

Hart

[11] Patent Number: 5,778,656
[45] Date of Patent: Jul. 14, 1998

[54] CABLE RETENTION DEVICE

[75] Inventor: Anthony John Hart, Nottingham, United Kingdom

[73] Assignee: Mansign Mining Equipment Limited, United Kingdom

[21] Appl. No.: 732,787

[22] Filed: Oct. 15, 1996

[30] Foreign Application Priority Data

Oct. 14, 1995 [GB] United Kingdom ............... 9521075

[51] Int. Cl.⁶ ............................................. F16G 13/16
[52] U.S. Cl. .............................. 59/78.1; 59/900; 248/49
[58] Field of Search ................ 59/78.1, 900; 248/49, 248/50, 51, 78

[56] References Cited

U.S. PATENT DOCUMENTS

| | | | |
|---|---|---|---|
| 5,027,595 | 7/1991 | Hart | 59/78.1 |
| 5,243,814 | 9/1993 | Hart | 59/78.1 |

FOREIGN PATENT DOCUMENTS

| | | | |
|---|---|---|---|
| 0 382 419 | 8/1990 | European Pat. Off. . | |
| 2111634 | 7/1983 | United Kingdom | 59/78.1 |
| 2214604 | 9/1989 | United Kingdom | 59/78.1 |
| 2257492 | 1/1993 | United Kingdom | 59/78.1 |

*Primary Examiner*—David Jones
*Attorney, Agent, or Firm*—Jones & Askew

[57] ABSTRACT

A cable handling chain link assembly comprising: a chain link; and a releasably connectable cable retention device; the link having an open sided cable compartment defined between an upper wall, a lower wall, and a partition extending between the upper and lower walls; the partition being located inboard from side edges of the upper and lower walls, the side edges defining the open side of the compartment; the partition including an aperture adjacent to an inside face of one of said walls through which the cable retention device extends; the cable retention device being a unitary member of generally elongate form having a main body from which longitudinally extends a resilient tongue formation having detent means for co-operation with the chain link to restrain withdrawal of the retention device in a longitudinal direction of the retention device; the resilient tongue formation co-operating with said inside face and a wall of said aperture opposed to said inside face to resiliently urge said detent means into contact with said link; the main body having a lateral projection extending laterally away from said inside face toward the wall opposite said one wall, said lateral projection acting to retain cables within said compartment, the main body and said one wall including co-operating latch formations which inter-engage on longitudinal insertion of the retention device to prevent separation of the main body away from said inside face.

13 Claims, 1 Drawing Sheet

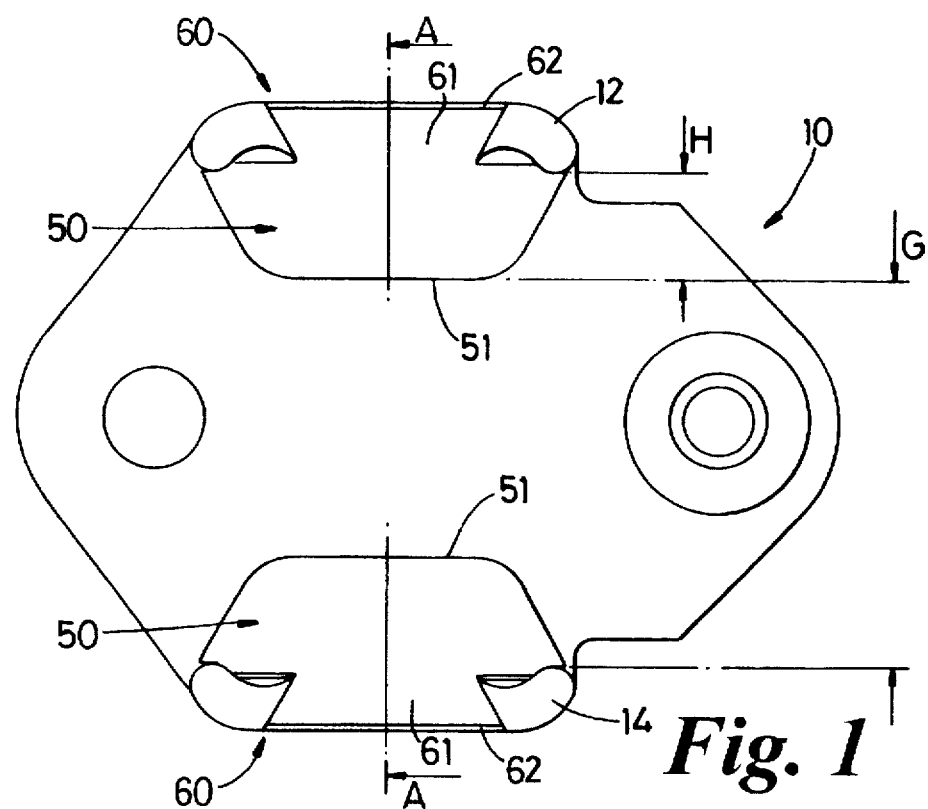
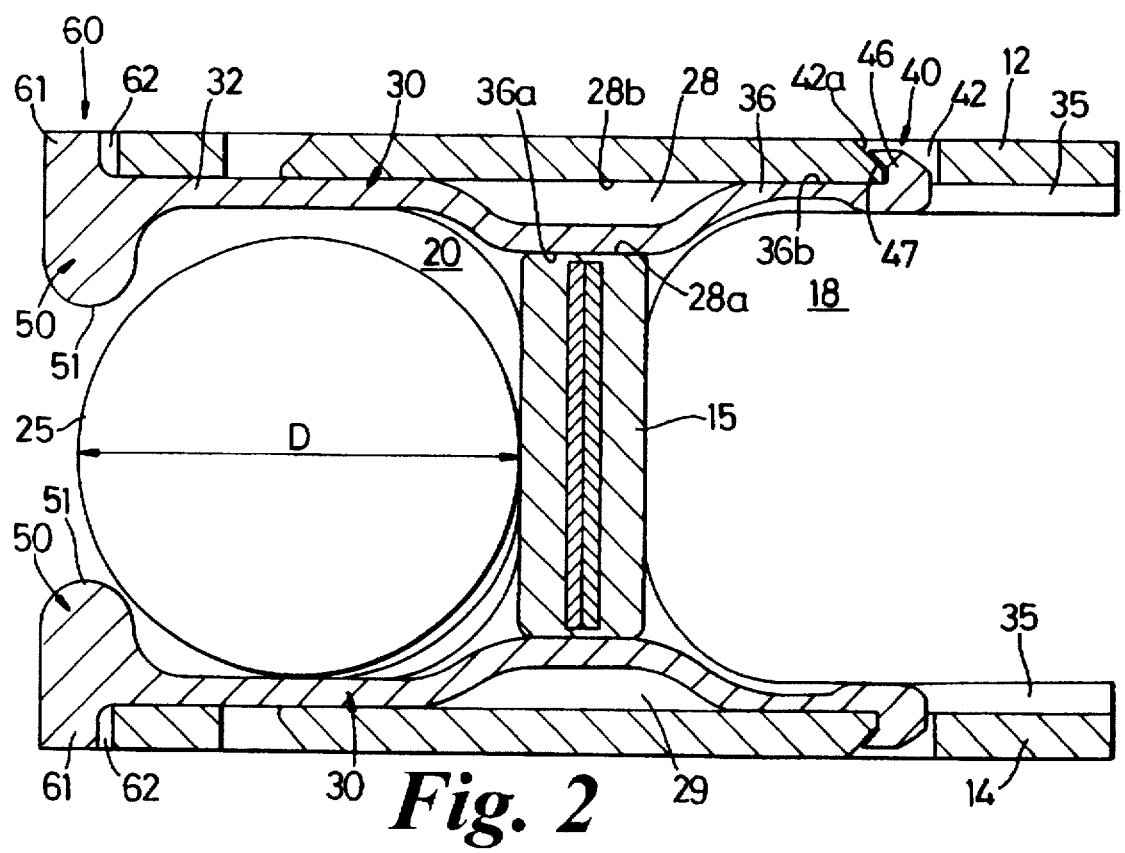

CABLE RETENTION DEVICE

The present invention relates to a cable retention device for use with a cable handling chains, to a cable handling chain including such a retention device and to a method of inserting/removing cables from a cable handling chain.

In our UK patent 2076107 B we describe a cable handling chain which is assembled from chain links.

The retention device of the present invention is primarily intended for use with the chain link constructed predominantly from a plastics material described in UK patent 2076107 and so reference should be made thereto for a detailed description and understanding of the chain link.

According to one aspect of the present invention there is provided a cable handling chain link assembly comprising a chain link; and a releasably connectable cable retention device;

the link having an open sided cable compartment defined between an upper wall, a lower wall, and a partition extending between the upper and lower walls;

the partition being located inboard from side edges of the upper and lower walls, the side edges defining the open side of the compartment;

the partition including an aperture adjacent to an inside face of one of said walls through which the cable retention device extends;

the cable retention device being a unitary member of generally elongate form having a main body from which longitudinally extends a resilient tongue formation having detent means for co-operation with the chain link to restrain withdrawal of the retention device in a longitudinal direction of the retention device;

the resilient tongue formation co-operating with said inside face and a wall of said aperture opposed to said inside face to resiliently urge said detent means into contact with said link;

the main body having a lateral projection extending laterally away from said inside face toward the wall opposite said one wall, said lateral projection acting to retain cables within said compartment, the main body and said one wall including co-operating latch formations which inter-engage on longitudinal insertion of the retention device to prevent separation of the main body away from said inside face.

According to another aspect of the present invention there is provided a cable handling chain including a plurality of chain links as defined above, selected chain links of which include a retention device located adjacent to the upper wall and a retention device located adjacent to the lower wall.

Preferably the combined height of the lateral projections of both retention devices is sufficient to retain a cable within the compartment, whereas the height of one lateral projection is sufficiently spaced apart from the opposed wall of the chain link to enable a cable to be removed through the open side of the link.

According to another aspect of the present invention there is provided a method of inserting/removing cables into a cable handling chain comprising a plurality of open sided chain links as defined above, the method including the steps of inserting a cable through the open side and into the compartment of each chain link, and inserting a pair of cable retention devices into the selected chain links to retain the cable within the chain, removal of the cable from the chain being achieved by removal of one of said pairs of cable retention devices only and passing the cable laterally through the gap defined between the lateral projection of the remaining cable retention device and the opposed lower or upper wall.

Various aspect of the present invention are hereinafter described, with reference to the accompanying drawings, in which:

FIG. 1 is a side view of a chain link assembly according to one embodiment of the present invention; and FIG. 2 is a cross-sectional view taken along line A—A in FIG. 1.

The chain link 10 includes an upper wall 12 and a lower wall 14. The upper and lower walls 12,14 are connected to one another and spaced apart by a partition wall 15.

The partition wall 15 is located in between the opposed ends of the upper and lower walls such that two open sided compartments 18,20 are defined for reception of cables.

In the illustrated embodiment a cable 25 is illustrated as being located in compartment 20 whereas compartment 18 is shown as being empty. The partition 15 is provided with a through bore or aperture 28 located adjacent to the upper wall and a through bore or aperture 29 located adjacent to the lower wall.

A pair of retention devices 30 are shown in FIGS. 1 and 2, one retention device 30 being located adjacent the upper wall and the other retention device being located adjacent the lower wall. Both retention devices 30 are of the same construction and operate in the same way. Accordingly construction and function of each retention device will be described below with reference to the upper retention device 30.

The retention device 30 is generally an elongate unitary member which is formed from a resilient material, preferably a suitable plastics material such as Nylon (registered trade mark). The plastics material may or may not be filled with reinforcement materials.

The retention device 30 is illustrated in FIGS. 1 and 2 in its cable retention position and includes a main body portion 32 and a tongue formation 36 which extends longitudinally from the body portion 32.

The tongue formation 36 is provided with a detent formation 40 which in the illustrated embodiment is in the form of a projection. The detent formation 40 locates into an aperture 42 formed in the upper wall and serves to restrain longitudinal withdrawal of the retention device from the chain link. Preferably, the detent formation 40 is in the form of a latch hook 46 having an abutment face 47 which in use abuts against the inner wall 42a of the aperture 42 in order to prevent longitudinal withdrawal of the retention device. Preferably the abutment face 47 and inner wall 42a are inclined in order to urge the detent further into the aperture 42 should the retention device be pulled in the withdrawal direction. In order to remove the retention device the tongue formation is deflected against the bias of the tongue to move the detent out of the aperture 42 and whilst in this deflected position longitudinal withdrawal is then possible.

Longitudinal movement of the device 30 is guided by a guide channel 35 formed on the inside face of the upper wall 12. A similar channel 35 is provided on the lower wall 14.

Deflection of the body can be achieved by pressing a suitable tool through the aperture 42 from the outside.

The tongue portion 26 has an inner face 36a and an outer face 36b which are laterally spaced from one another by a greater distance than the width of aperture 28 defined between opposed faces 28a, 28b; accordingly when the retention device is fully inserted, the tongue portion 36 acts to bias the detent into contact with the aperture 42 in the upper wall by a cantilever action which is achieved by the tongue portion passing through the bore or aperture 28. Accordingly as the device 30 is inserted longitudinally, the tongue portion 36 is resiliently deformed as it is pushed through the bore 28 by engagement between face 28a and the inside face of the upper wall.

The body portion 32 and link wall 12 are provided with cooperating latch formations 60 which inter-engage when the retention device 30 is longitudinally inserted. The latch formations 60 inter-engage so as to prevent lateral separation of the body portion 32 away from wall 12. This is advantageous as it prevents the body portion 32 from being dislodged during use by, for example, snagging an obstacle whilst the chain is being hauled.

Preferably the latch formations 60 comprise a dovetail connection defined by a tongue 61 and groove 62, the tongue 61 preferably being formed on body portion 32 and the groove 62 being formed in wall 12(14). It will be appreciated that the tongue 61 and groove 62 may be of other different combination shapes in order to achieve the same function.

The body portion 32 is provided with a lateral projection 50 which extends toward the opposite wall and thereby provides a restriction to the open side of the cable compartment 20 in order to retain cable 25 within the compartment.

Preferably the height H of the projection 50 is chosen bearing in mind the diameter D of the cable 25 to be retained such that the terminal face 51 of the projection is spaced by a distance G from the opposed wall 12 or 14 respectively to define a cable exit gap such that the cable 25 may be removed through the gap between face 51 and the opposed link wall when the opposed retention device has been removed.

The distance G which corresponds to the width dimension of the exit gap may be the same or greater than diameter D to provide an unrestricted passageway through the exit gap. Alternatively distance G may be slightly less than diameter D. In this case, removal of the cable 25 will rely upon resilient deflection of the walls 12,14.

Preferably the projection 50 extends longitudinally across substantially the full width of walls 12,14 as shown in FIG. 1.

Also, the terminal face 51 of projection 50, at least on its inner side, is preferably shaped in cross-section to facilitate removal of the cable 25. In the illustrated embodiment, the terminal face 51 in cross-section is curved, preferably circular, but it will be appreciated that other geometric shapes may be adopted to achieve the same purpose.

It will be appreciated from the above that during normal usage of a chain composed of a plurality of links 10 the cable 25 is retained within its respective compartment by two retention devices. Normally, during assembly, a cable will be inserted into a compartment and thereafter two retention devices 3 will be inserted to retain the cable in selected links 10. To remove the cable, however, it is only necessary to remove one retention device and to then pull the cable through the gap defined between the projection 50 of the remaining retention device and the opposed link wall 12 or 14.

In the above example, both retention devices 30 have projections of the same height H. This is the preferred arrangement. However it will be appreciated that two retention devices 3 having projections 50 of different heights may be used.

I claim:

1. A cable handling chain link assembly comprising:
   a chain link; and
   a releasably connectable cable retention device;
   the link having an open sided cable compartment defined between an upper wall, a lower wall, and a partition extending between inside faces of the upper and lower walls, the compartment having a height to receive a cable of certain diameter;
   the partition being located inboard from side edges of the upper and lower walls, the side edges defining the open side of the compartment wherein the partition includes at least one aperture adjacent to an inside face of one of said upper or lower walls;
   the cable retention device being a unitary member of generally elongate form having a main body from which longitudinally extends a resilient tongue formation having detent means for co-operation with the chain link on one side of the partition to restrain withdrawal of the retention device in a longitudinal direction of the retention device;
   the resilient tongue formation co-operating with said inside face and a wall of said aperture opposed to said inside face to resiliently urge said detent means into contact with said link;
   the main body having a lateral projection with a height extending laterally away from said inside face toward the wall opposite said one wall, said lateral projection being located on the side of the partition opposite to said one side and acting to retain cables within said compartment; and
   the main body and said one wall including co-operating latch formations which inter-engage on longitudinal insertion of the retention device to prevent separation of the main body in the lateral direction away from said inside face.

2. An assembly according to claim 1 wherein the partition includes apertures adjacent to an inside face of the upper wall and adjacent to an inside face of the lower wall, a pair of said cable retention devices being provided, one of the retention devices extending through the aperture adjacent to the inside face of the upper wall and the other of the retention devices extending through the aperture adjacent to the inside face of the lower wall.

3. A cable handling chain link assembly as in claim 1 the partition including an aperture adjacent to an inside face of the upper wall and an aperture adjacent to an inside face of the lower wall, a pair of said cable retention devices being provided, one of the retention devices extending through the aperture adjacent to the inside face of the upper wall and the other of the retention devices extending through the aperture adjacent to the inside face of the lower wall, the combined height of the lateral projections of both retention devices being sufficient to retain a cable within the compartment, whereas the height of one lateral projection is spaced apart from the opposed wall of the chain link to define an exit gap which is sufficiently wide to enable the cable to be removed through the open side of the link.

4. An assembly according to claim 3 wherein the exit gap has a width dimension the same as or greater than the diameter of the cable to be retained within the chain link.

5. An assembly according to claim 3 wherein said walls of the chain link are capable of resilient deflection, the exit gap having a width dimension less than the diameter of the cable to be retained within the chain link to enable passage of the cable through said exit gap utilising said resilient deflection of said walls.

6. An assembly according to claim 3 wherein the projection of each retention device has an inner side shaped to facilitate removal of a cable through the exit gap.

7. An assembly according to claim 6 wherein the projection, in cross-section, is curved.

8. An assembly according to claim 2 wherein each wall has a predetermined width, and the projection of each retention device extends longitudinally across substantially the full width of said walls.

9. An assembly according to claim 2 wherein said co-operating latch formations comprise a dovetail connection.

10. An assembly according to claim 2 wherein said detent means for each retention device comprises a detent formation on said resilient tongue and an aperture formed in the co-operating wall of the chain link.

11. An assembly according to claim 10 wherein the detent formation and aperture are adapted to co-operate such that the detent formation is urged further into contact with said aperture when the retention device is longitudinally withdrawn from the chain link.

12. A cable handling chain including a plurality of chain link assemblies according to claim 2.

13. A method of inserting/removing cables into a cable handling chain including a plurality of chain link assemblies according to claim 2, the method including the steps of inserting a cable through the open side and into the compartment of each chain link, and inserting a pair of cable retention devices into selected chain links to retain the cable within the chain, removal of the cable from the chain being achieved by removal of one of said pairs of cable retention devices only and passing the cable laterally through the gap defined between the lateral projection of the remaining cable retention device and the opposed lower or upper wall.

* * * * *